United States Patent [19]

Asayama

[11] Patent Number: 5,046,575

[45] Date of Patent: Sep. 10, 1991

[54] THROTTLE CONTROL APPARATUS FOR AN INTERNAL COMBUSTION ENGINE

[75] Inventor: Yoshiaki Asayama, Himeji City, Japan

[73] Assignee: Mitsubishi Denki Kabushiki Kaisha, Tokyo, Japan

[21] Appl. No.: 461,491

[22] Filed: Jan. 5, 1990

[30] Foreign Application Priority Data

Jan. 7, 1989 [JP] Japan ........................ 1-1633
Jan. 9, 1989 [JP] Japan ........................ 1-2532
Jan. 9, 1989 [JP] Japan ........................ 1-2533

[51] Int. Cl.[5] ........................ B60K 31/04
[52] U.S. Cl. ........................ 180/178; 123/399
[58] Field of Search ........................ 180/178, 179; 123/361, 123/399

[56] References Cited

U.S. PATENT DOCUMENTS

| | | | |
|---|---|---|---|
| 4,217,867 | 8/1980 | Madsen et al. | 180/178 |
| 4,237,742 | 12/1980 | Barthruff | 180/178 |
| 4,392,502 | 7/1983 | Weston | 123/396 |
| 4,727,840 | 3/1988 | Nishida et al. | 123/399 |
| 4,768,483 | 9/1988 | Asayama | 123/399 |
| 4,771,847 | 9/1988 | Michell | 180/179 |
| 4,785,782 | 11/1988 | Tanaka et al. | 123/399 |
| 4,848,505 | 7/1989 | Yoshizawa et al. | 180/197 |
| 4,892,071 | 1/1990 | Asayama | 123/399 |

FOREIGN PATENT DOCUMENTS

| | | |
|---|---|---|
| 315794 | 5/1989 | Fed. Rep. of Germany . |
| 01646 | 5/1987 | Japan . |

*Primary Examiner*—David M. Mitchell

*Attorney, Agent, or Firm*—Sughrue, Mion, Zinn, Macpeak & Seas

[57] ABSTRACT

A throttle control apparatus for an internal combustion engine which is compact in size, highly safe in operation, and applicable to a cruise control device without requiring any operator's accelerator pedal operation. The throttle control apparatus comprises: a throttle valve disposed in an intake pipe for adjusting the flow rate of intake air supplied to the engine; a valve shaft rotatably supported on the intake pipe and fixedly mounting thereon the throttle valve for rotation therewith; a throttle lever fixedly mounted on the valve shaft for rotation therewith; a motor operatively connected with the throttle lever for driving the throttle lever to thereby adjust the opening degree of the throttle valve; a power transmitting mechanism operatively connected between the throttle lever and the motor for transmitting power from the motor to the throttle in such a manner that the throttle lever is forced to rotate by the motor; an accelerator pedal adapted to be operated by an operator; a rotary disk rotatably mounted on the valve shaft and operatively connected with the accelerator pedal in such a manner that it is rotated around the valve shaft as the accelerator pedal is operated by the operator; and a rotation limiter for limiting relative rotation between the throttle lever and the throttle disk to a predetermined rotational range whereby the maximum opening degree of the throttle valve due to the motor is limited to a certain level which corresponds to the amount of operation of the acceleration pedal due to the operator.

11 Claims, 5 Drawing Sheets

THROTTLE CONTROL APPARATUS FOR AN INTERNAL COMBUSTION ENGINE

BACKGROUND OF THE INVENTION

The present invention relates to a throttle control apparatus for an internal combustion engine, and more particularly to such a throttle control apparatus that controls the output power of the engine by means of an electronically-controlled actuator such as a motor.

In general, the amount of intake air sucked into an engine of an automotive vehicle is controlled by the opening and closing of a throttle valve which is disposed in an intake passage or pipe. The throttle valve is usually mechanically connected through a wire cable with an accelerator pedal so that it is opened and closed by the accelerator pedal in a mechanical fashion.

In recent years, however, in order to improve the driving feeling of an operator and the running performance of an automobile, many throttle control apparatuses have been studied and developed in which a throttle valve is operatively connected with an accelerator pedal through a wire cable with an electronic control means interposed therein so that it is operated to open and close under the action of an electronically-controlled acutator which is controlled based on an electric signal corresponding to a control amount of the throttle valve (i.e., the amount of rotation of the throttle valve required to get a target throttle opening degree) which is successively calculated based on an accelerator pedal signal representative of the amount of depression of the accelerator pedal operated by the operator, and other signals indicating the operating conditions of the engine and/or the running conditions of the vehicle such as, for example, an engine speed signal representative of the number of revolutions per minute of the engine, a gear position signal representative of a shift gear position, a wheel slip signal representative of slip of the vehicle's wheels, etc.

With this electrically-controlled type of throttle control apparatus, however, if the electronically-controlled actuator or the electronic controller for operating the throttle valve fails, there is a possibility that the throttle valve is continuously held open irrespective of the operator's desire, causing the vehicle to accelerate. Therefore, it is necessary to provide a safety or failsafe device for avoiding such a dangerous situation.

In the past, Japanese Patent Publication No. 61-54933 disclosed an electronically-controlled throttle control apparatus which has a first throttle valve adapted to be operated by an electronically-controlled actuator and a second throttle valve disposed in serial relation with the first throttle valve, the second throttle valve being operatively connected with an accelerator pedal so that it acts as a safety means in case of a failure of the electronically-operated actuator in which the first throttle valve is held open.

Also, Japanese Patent Laid-Open No. 61-60331 discloses another type of electronically-controlled throttle control apparatus which has an accelerator-pedal-operated first throttle valve and an electrically-operated second throttle valve both serially disposed in an intake passage of an engine. The second throttle valve is electrically operated to open and close for slip control during acceleration, whereas the first throttle valve can be operated to open and close under the action of an accelerator pedal in order to secure safety during driving in cases where the second throttle valve fails.

In both of the above-described conventional throttle control apparatuses having an electronically-controlled throttle valve and an accelerator-pedal-operated throttle valve, it is possible to prevent a run-away condition of a vehicle and thus secure driving safety under the action of the second throttle valve operatively connected with the accellerator pedal even if the first throttle valve operated by an electrically-controlled actuator fails. However, to dispose two throttle valves in the intake passage in a serial relation with each other enlarges the structure of the entire intake system with the result that difficulty arises in installing such a large intake system in a relatively limited engine compartment of a vehicle. Further, neither of the above-described conventional throttle control apparatuses can be applied to a vehicle which has a cruise control device for enabling the vehicle to automatically cruise without the accelerator pedal being operated by the operator since in both of the above conventional apparatuses, it is required to operate an accelerator pedal in order to open and close the electrically-operated throttle valve.

SUMMARY OF THE INVENTION

Accordingly, the present invention is intended to obviate the above-described problems of the conventional throttle control apparatus.

An object of the present invention is to provide a throttle control apparatus for an internal combustion engine which is small in size, high in safety, and can be applied to a cruise control device without requiring any accelerator pedal operation on the part of an operator.

In order to achieve the above object, according to the present invention, there is provided a throttle control apparatus for an internal combustion engine comprising:

a throttle valve disposed in an intake pipe for adjusting the flow rate of intake air supplied to the engine;

a valve shaft rotatably supported on the intake pipe and fixedly mounting thereon the throttle valve for rotation therewith;

throttle lever means fixedly mounted on the valve shaft for rotation therewith;

a motor operatively connected with the throttle lever means for driving the throttle lever means to adjust the opening degree of the throttle valve;

power-transmitting means operatively connected between the throttle lever means and the motor for transmitting power from the motor to the throttle lever means in such a manner that the throttle lever means is forced to rotate by the motor;

an accelerator pedal adapted to be operated by an operator;

rotary disk means rotatably mounted on the valve shaft and operatively connected with the accelerator pedal in such a manner that it is rotated around the valve shaft as the accelerator pedal is operated by the operator; and rotation-limiting means for limiting relative rotation between the throttle lever means and the throttle disk means to a predetermined rotational range whereby the maximum opening degree of the throttle valve due to the motor is limited to a certain level which corresponds to the amount of operation of the accelerator pedal due to the operator.

In one embodiment, the power-transmitting means comprises:

first drive pulley means operatively connected with the motor;

second driven pulley means rotatably mounted through a support shaft on the rotary disk means;

belt means for connecting between the first and second pulley means so that the second pulley means is driven to rotate around the support shaft as the first pulley means is rotated by the motor; and connection means for operatively connecting between the second pulley means and the throttle lever means in such a manner that the throttle lever means is rotated in accordance with the rotation of the second pulley means.

In another embodiment, the power-transmitting means comprises:

a first drive gear wheel operatively connected with the motor;

a second driven gear wheel rotatably mounted through a support shaft on the rotary disk means and engaged with the first drive gear wheel; and connection means for operatively connecting between the second driven gear wheel and the throttle lever means in such a manner that the throttle lever means is rotated in accordance with the rotation of the second driven gear wheel.

The connection means may be, in one embodiment, link means having one end rotatably connected with the second driven pulley means or gear wheel and the other end rotatably connected with the throttle lever means.

The connection means may be, in another embodiment, a pulley-and-belt transmission means which comprises:

third drive pulley means fixedly mounted on the support shaft for integral rotation with the second driven pulley means or gear wheel;

fourth driven pulley means fixedly mounted on the valve shaft; and belt means for operatively connecting the third and fourth pulley means so that the fourth pulley means is forced to rotate in accordance with the rotation of the third pulley means around the support shaft.

The connection means may be, in a further embodiment, a gear transmission which comprises:

a third drive gear wheel fixedly mounted on the support shaft for integral rotation with the second driven pulley means or gear wheel; and a fourth driven gear wheel fixedly mounted on the valve shaft and engaged with the third drive gear wheel so that it is forced to rotate in accordance with the rotation of the third drive gear wheel.

Here, it is to be noted that pulley means of the present invention includes a pulley, a sprocket and the like, and belt means of the present invention includes a belt, a chain and the like.

Preferably, the throttle lever means may be integrally formed with and acts as the fourth driven pulley means or gear wheel.

Preferably, the rotation-limiting means is a slot-and-pin arrangement which comprises:

a slot formed in one of the throttle lever means and the rotary disk means at a location radially apart from the central axis thereof, the slot having two circumferentially spaced ends; and a stop pin fixed to the other of the throttle lever means and the rotary disk means and extending therefrom into the slot in such a manner that it abuttingly engages the slot ends when the throttle lever means rotates in opposite directions retative to the rotary disk means.

In a further embodiment, the throttle control apparatus may comprise:

a speed sensor for sensing the speed of a vehicle and generating an output signal representative of the sensed vehicle speed;

a throttle sensor for sensing the opening degree of the throttle valve and generating an output signal representative of the sensed throttle valve opening degree;

a controller having a cruise control switch and connected to receive the output signals of the speed sensor and the throttle sensor for controlling the motor; and an actuator operatively connected with the rotary disk means and adapted to be operated by the controller when the cruise control switch is turned on by the operator for driving the rotary disk means to rotate around the valve shaft in a direction to open the throttle valve, whereby the controller determines a target opening degree of the throttle valve corresponding to a target speed at which the vehicle is travelling when the cruise control switch is turned on, and then controls the motor in such a manner that the throttle lever means is rotated by the motor through the power-transmitting means so as to cause the opening degree of the throttle valve to be at the target opening degree, the controller being further operable to make the actuator inoperative so as to allow free movement of the rotary disk means due to the operator through the accelerator pedal.

The above and other objects, features and advantages of the present invention will become apparent from the following detailed description of a few presently preferred embodiments of the invention taken in conjunction with the accompanying drawings.

DETAILED DESCRIPTION OF THE PREFERRED EMBODIMENTS

The present invention will now be described in detail with reference to a few preferred embodiments as illustrated in the accompanying drawings.

Figure 1:
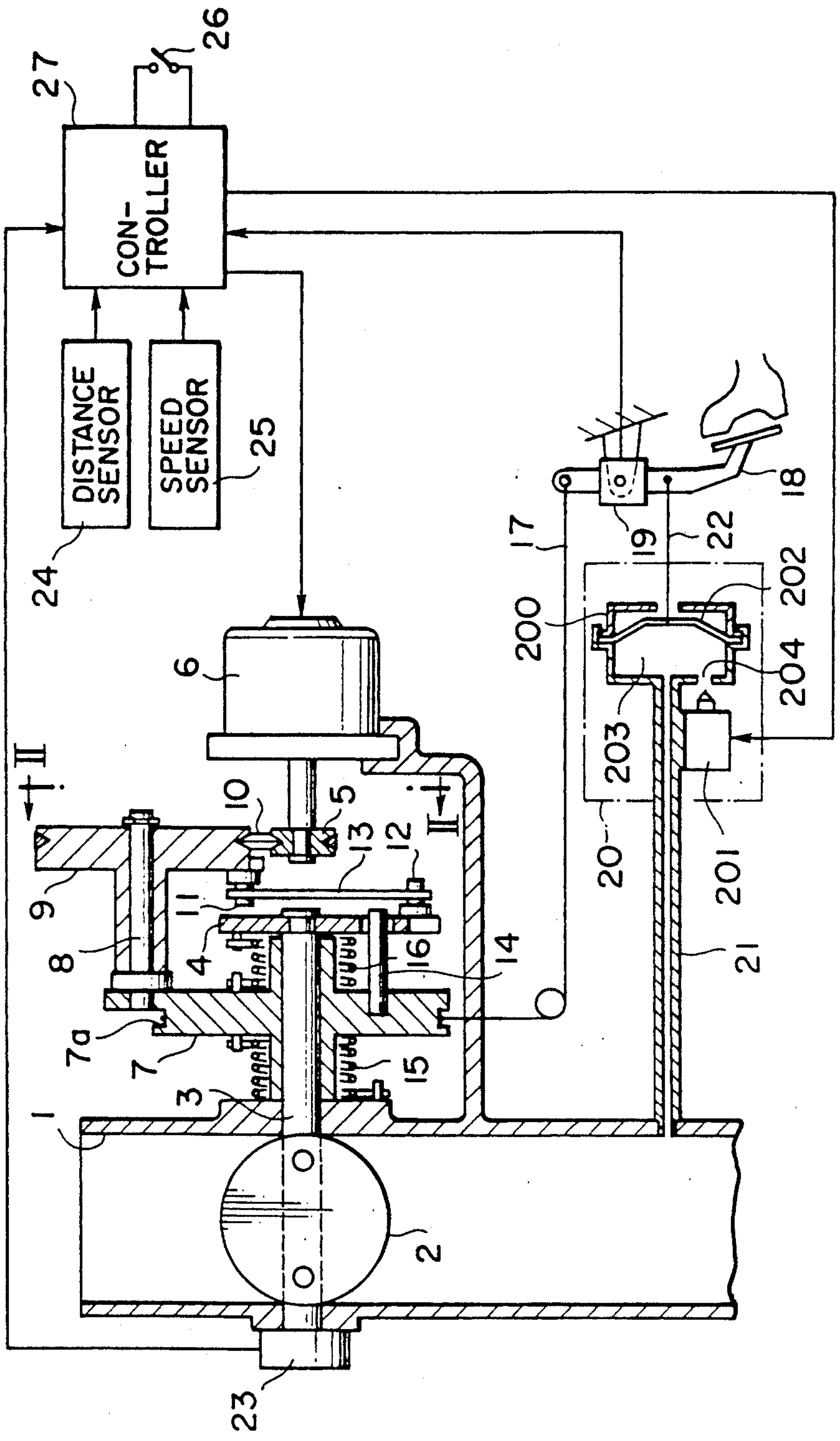
FIG. 1 is a schematic view showing the general arrangement of a throttle control apparatus for an internal combustion engine in accordance with a first embodiment of the present invention.
Figure 2:
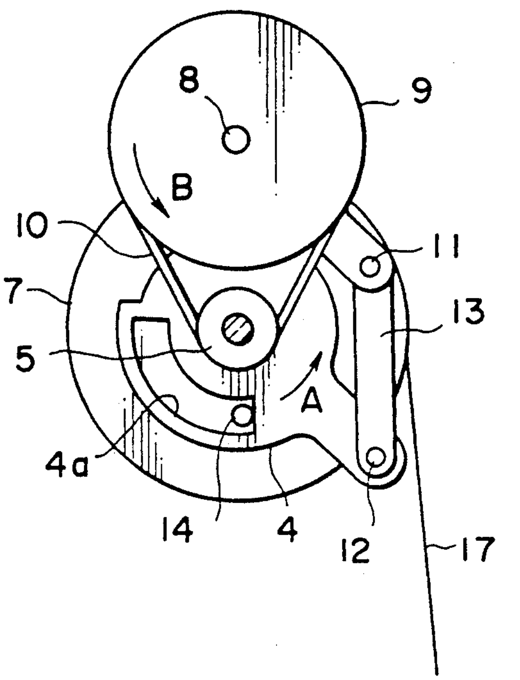
FIG. 2 is a cross section taken along the line II—II of FIG. 1.

Referring to the drawings and first to FIGS. 1 and 2 which illustrate a first embodiment of the present invention which is applied to a cruise control device for a vehicle in which the opening degree of a throttle valve is automatically controlled to an appropiate value in order to make the vehicle cruise at a prescribed speed as dictated by the operator as well as to maintain the intervehicle distance (vehicle-to-vehicle distance) at a prescribed appropriate level, i.e., to recover an appropriate intervehicle distance when the distance between the present vehicle and a preceding vehicle, which is sensed by a distance sensor, becomes smaller than a prescribed distance.

In FIG. 1, a throttle valve 2 is disposed in an intake pipe 1 of an engine (not shown) for controlling the flow rate of intake air sucked into the engine. The throttle valve 2 has a valve shaft 3 rotatably supported at its opposite ends on the intake pipe 1, one end of the throttle valve 2 extending to the outside of the intake pipe 1 so as to have a throttle lever 4 fixedly mounted thereon. A first drive pulley 5 is disposed in alignment with the central axis of the throttle lever 4 with a certain space formed therebetween. The first pulley 5 is operatively coupled with the rotary shaft of an electric motor 6. A rotary disk 7 is rotatably mounted on the valve shaft 3 and has a support shaft 8 fixedly mounted thereon at a location radially away from the rotational axis of the rotary disk 7, the support shaft 8 extending in parallel to the valve shaft 3. Rotatably mounted on the support shaft 8 is a second driven pulley 9 which is operatively connected with the first drive pulley 5 through a V-shaped belt 10. The second driven pulley 9 is greater in diameter than the first drive pulley 5 and has a radial extension on which a first connection pin 11 is fixed, extending laterally or perpendicularly of the side surface of the second pulley 9. A second connection pin 12 is fixed on a radial extension which is integrally formed with the throttle lever 4, the second connection pin 12 extending perpendicularly of the side surface of the throttle lever 4. A link member 13 is rotatably connected at one end with the first connection pin 11 and at the other end with the second connection pin 12 so that the second pulley 9 and the throttle lever 4 are connected with each other through the link member 13 so as to form a kind of parallel motion mechanism.

As clearly seen from FIG. 2, the throttle lever 4 takes a generally circular shape and has an arcuate rotation-limiting slot 4*a* formed therethrough at a location radially apart from its central axis, the rotation-limiting slot 4*a* extending a predetermined distance in the circumferential direction of the generally circular-shaped throttle lever 4. A stop pin 14 is fixedly implanted at its base end into the rotary disk 7 at its one side at a location which is radially spaced from the central axis thereof and which corresponds to the location of the rotation-limiting slot 4*a*. The stop pin 14 extends at its tip end into the rotation-limiting slot 4*a* and serves to limit the range of relative rotation between the throttle lever 4 and the rotary disk 7 when it engages either of the opposite ends of the rotation-limiting slot 4*a*.

A return spring 15 in the form of a coiled spring is disposed between, and fixedly attached at its opposite ends to, one side surface of the rotary disk 7 and a spring retainer integrally formed on the outer surface of the intake pipe 1 for imparting a biasing force or torque to the rotary disk 7 in a direction (i.e., in the counterclockwise direction as indicated by arrow A in FIG. 2) to return the throttle valve 2 to its closed position through the intermediary of the stop pin 14, the throttle lever 4 and the throttle valve 2. On the other hand, a biasing spring 16 in the form of a coiled spring is disposed between, and fixedly attached at its opposite ends to, the other side surface of the rotary disk 7 and the throttle lever 4 for biasing the throttle lever 4 to rotate in such a direction (i.e., in the clockwise direction in FIG. 2) that the throttle lever 4 is brought into abutting engagement at one end of the rotation-limiting slot 4*a* with the stop pin 14. The spring force of the biasing spring 16 is set to be smaller than that of the return spring 15 which is also greater than the output power of the motor 6.

The rotary disk 7 is formed on its outer peripheral surface with an annular groove 7*a* around which an acceleration wire 17 is entrained. The acceleration wire 17 is attached at one end to the rotary disk 7 and at the other end to an accelerator pedal 18 so that when the operator depresses the accelerator pedal 18, the rotary disk 7 is forced to rotate against the biasing force of the return spring 15 through the acceleration wire 17, thereby rotating, via the second pulley 9, the link member 13 and the throttle lever 4, the valve shaft 3 in a direction to open the throttle valve 2. Here, it is to be noted that clockwise rotation of the rotary disk 7 in FIG. 2 does not cause rotation of the throttle lever 4 through the stop pin 14 and the rotation-limiting slot 4*a* because the stop pin 14 is able to freely move in the slot 4*a* until it abuts against the other end of the slot 4*a*.

An acceleration sensor 19 is mounted on the acceleration pedal 18 for sensing the amount of depression thereof by an operator. The acceleration sensor 19 generates an output signal representative of the accelerator pedal depression amount thus sensed.

As schematically illustrated in FIG. 1, an actuator 20 in the form of a vacuum-operated actuator is operatively connected to the accelerator pedal 18. The actuator 20 comprises a housing 200 with an air-introduction opening 204 for communicating the interior of the housing 200 with the outside atmosphere, an electromagnetic valve 201 for opening and closing the air-introduction opening 204, and a diaphragm 202 disposed in the housing for defining therein a vacuum chamber 203 on its one side, the vacuum chamber 203 being in fluid communication through a vacuum-introduction pipe 21 with that portion of the intake pipe 1 which is downstream of the throttle valve 2. The diaphram 202 is connected at its center with the accelerator pedal 18 through a diaphragm wire 22. The electromagnetic valve 201 is mounted on the pipe 21 and operates, when energized, to close the air-introduction opening 204 in the actuator housing 200 so that the vacuum introduced from the intake pipe 1 into the vacuum chamber 203 through the pipe 21 becomes effective and acts on the diaphragm 202 to draw it, thereby rotating the accelerator pedal 18 in the clockwise direction in FIG. 1 through the intermediary of the the diaphragm wire 22. On the other hand, when the electromagnetic valve 201 is deenergized, it opens the air-introduction opening 204 so that atmospheric air flows into the vacuum chamber 203 through the air-introduction opening 204, thereby moving the diaphragm 202 to the right in FIG. 1 (i.e., to the original position) and thus relieving the biasing force of the diaphragm 202 imparted on the accelerator pedal 18. In this connection, it is to be noted that although the diaphragm 202 is connected with the accelerator pedal 18, it may be directly connected with the rotary disk 7 through a wire. Also, the vacuum-operated actuator 20 can be replaced by any kind of actuator which is operated by the cruise control switch 26 to rotate the rotary disk 7 and hence the valve shaft 3 in a direction to close the throttle valve 2.

A throttle sensor 23 in the form of a pontentiometer is mounted on the valve shaft 3 at its one end for sensing the opening degree of the throttle valve 2 and generating an output signal representative of the sensed throttle opening degree.

Also, provisions are made for a distance sensor 24 in the form of a radar device for sensing the intervehicle distance between the present vehicle and a preceding vehicle and generating an output signal representative of the sensed intervehicle distance, and a speed sensor 25 for sensing the speed of the vehicle and generating and output signal representative of the sensed vehicle speed. A cruise control switch 26 is adapted to be switched on and off by the operator for making the vehicle cruise under automatic control.

A controller 27 in the form of an electronic controller for controlling the operation of the electric motor 6 as well as for opening and closing the electromagnetic valve 201 is connected to receive the output signals of the accelerator sensor 19, the throttle sensor 23, the distance sensor 24, the speed sensor 25 and the cruise control switch 26, operates to perform predetermined operational calculations based on the outputs signals and outputs control signals to the electric motor 6 and the electromagnetic valve 201.

Now, the operation of the above-described embodiment will be described.

During the normal operation of the vehicle in which the vehicle travels under the control of the accelerator pedal 18 by the operator with the cruise control switch 26 being turned off, power supply to the electromagnetic valve 201 of the vacuum actuator 20 is shut off and the valve 201 is deenergized to open the air-introduction opening 204 in the actuator housing 200. In this state, the pressure in the vacuum chamber 203 of the actuator 20 becomes substantially equal to the atmospheric pressure so that the diagram 202 is held at the original position as shown in FIG. 1, thus allowing free movement of the accelerator pedal 18 by the operator. Accordingly, when the operator depresses the accelerator pedal 18 to rotate it around its fulcrum in the clockwise direction in FIG. 1, the acceleration wire 17 is pulled by the accelerator pedal 18 to rotate the rotary disk 17 together with the second pulley 9 in the clockwise direction in FIG. 2 against the bias of the return spring 15. With this clockwise rotary movement of the second pulley 9 around the valve shaft 3, the throttle lever 4 is forced to rotate in the clockwise direction in FIG. 2 through the intermediary of the link member 13, thereby rotating the valve shaft 2 fixed to the throttle lever 4 in the opening direction of the throttle valve 2. As a result, the amount or flow rate of intake air to be sucked into the engine through the intake pipe 1 is adjusted to increase the output power of the engine.

On the other hand, in cases where the operator wants to place the vehicle under cruise control, e.g., make the vehicle travel at the speed of 100 Km/h, the operator first steps on the accelerator pedal 18 to get the target speed of 100 Km/h and then turns on the cruise control switch 26 once the vehicle reaches the target speed. As a consequence, the electromagnetic valve 201 is energized by the output signal of the controller 27 to close the air-introduction opening 204 in the actuator housing 200 whereby air in the vacuum chamber 203 is evacuated or flows into the intake pipe 1 through the pipe 21 to bring the vacuum chamber 203 under vacuum so that the diaphragm 202 is drawn or moved to the left in FIG. 1 under the action of vacuum in the vacuum chamber 203, thus pulling the accelerator pedal 18 through the diaphragm wire 22. Thus, the accelerator pedal 18 is forced to rotate around its fulcrum in the clockwise direction in FIG. 1, causing the rotary disk 7 to rotate in the clockwise direction in FIG. 2 against the bias of the return spring 15 so that the throttle valve 2 is rotated toward its fully open position through the second pulley 9, the link member 13, the throttle lever 4 and the value shaft 3. In this state, the electronic controller 27 receives the output signal of the speed sensor 25 and controls the operation of the electric motor 6 so as to get the target speed. Specifically, the rotation of the electric motor 6 is transmitted to the throttle lever 4 at a reduced speed through the intermediary of the first drive pulley 5, the belt 10 and the second driven pulley 9 so that the valve shaft 3 fixed to the throttle lever 4 is rotated in a direction to reduce the opening degree of the throttle valve 2 to a specific level corresponding to the target speed. In this case, as the second pulley 9 is first rotated by the motor 6 in the counterclockwise direction as indicated by arrow B in FIG. 2, the throttle lever 4 connected through the link member 13 with the second pulley 9 is forced to rotate in the counterclockwise direction as indicated by arrow A in FIG. 2 against the bias of the biasing spring 16, thereby driving the throttle valve 2 in the closing direction. Thereafter, when the second pulley 9 is rotated by the motor 6 in the clockwise direction opposite that indicated by arrow B in FIG. 2, the throttle lever 4 is forced to rotate in the clockwise direction opposite that indicated by arrow A in FIG. 2, i.e., in the throttle opening direction. In this manner, the throttle valve 2 is controlled to such an appropriate opening degree as to get the target vehicle speed. Further, under this cruise control operation, when the controller 27 recognizes based on the output signal of the distance sensor 24 that the intervehicle distance between the present vehicle and the preceding vehicle sensed by the distance sensor 24 is shorter than a prescribed distance, it controls the electric motor 6 in such a manner that the throttle valve 2 is moved in the closing direction to an appropriate opening degree irrespective of the target speed. As a result, the speed of the vehicle is properly reduced to increase the intervehicle distance relative to the preceding vehicle, and once the intervehicle distance comes to a suitable level, the controller 27 resumes the cruise control.

If electric components such as the electric motor 6, wirings and the like should fail or should there be too much slack or a break in the belt 10 during the cruise control operation, the electronic controller 27 detects such abnormal situations based on the output signal of the throttle sensor 23 (i.e., there is disagreement between the target speed and the actual speed of the vehicle), and shuts off power supply to the electromagnetic valve 201 so that valve 201 is deenergized to open the air-introduction opening 204 in the actuator housing 200, thus introducing atmospheric air into the vacuum chamber 203. As a result, the accelerator pedal 18 is relieved of the pull of the diaphragm 202, allowing the operator's free and direct control on the accelerators pedal 18 so that the operator can directly adjust the opening degree of the throttle valve 2 through the accelerator pedal 18 at his or her own will. In this case, rotation of the throttle lever 4 in the throttle opeing direction by means of the motor 6 is positively restricted by the engagement of one end of the rotation-limiting slot 4*a* in the throttle lever 4 with the stop pin 14 fixed to the rotary disk 7 since the biasing force of the return spring 15 is set greater than the output force of the motor 6. Accordingly, the throttle valve 2 is prevented from being operated by the motor 6 to a larger opening degree beyond that which corresponds to the amount of operation or depression of the accelerator pedal 18 by the operator, thus making it possible to avoid a run-away condition of the vehicle.

Figure 4:
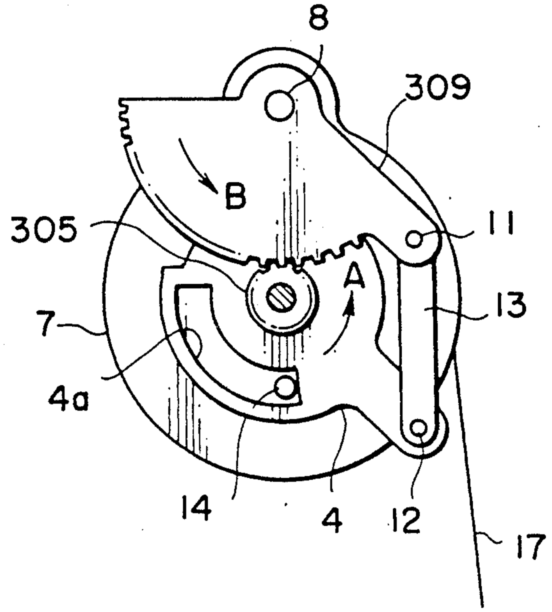
FIG. 4 is a cross section taken along the line IV—IV of FIG. 3.
Figure 3:
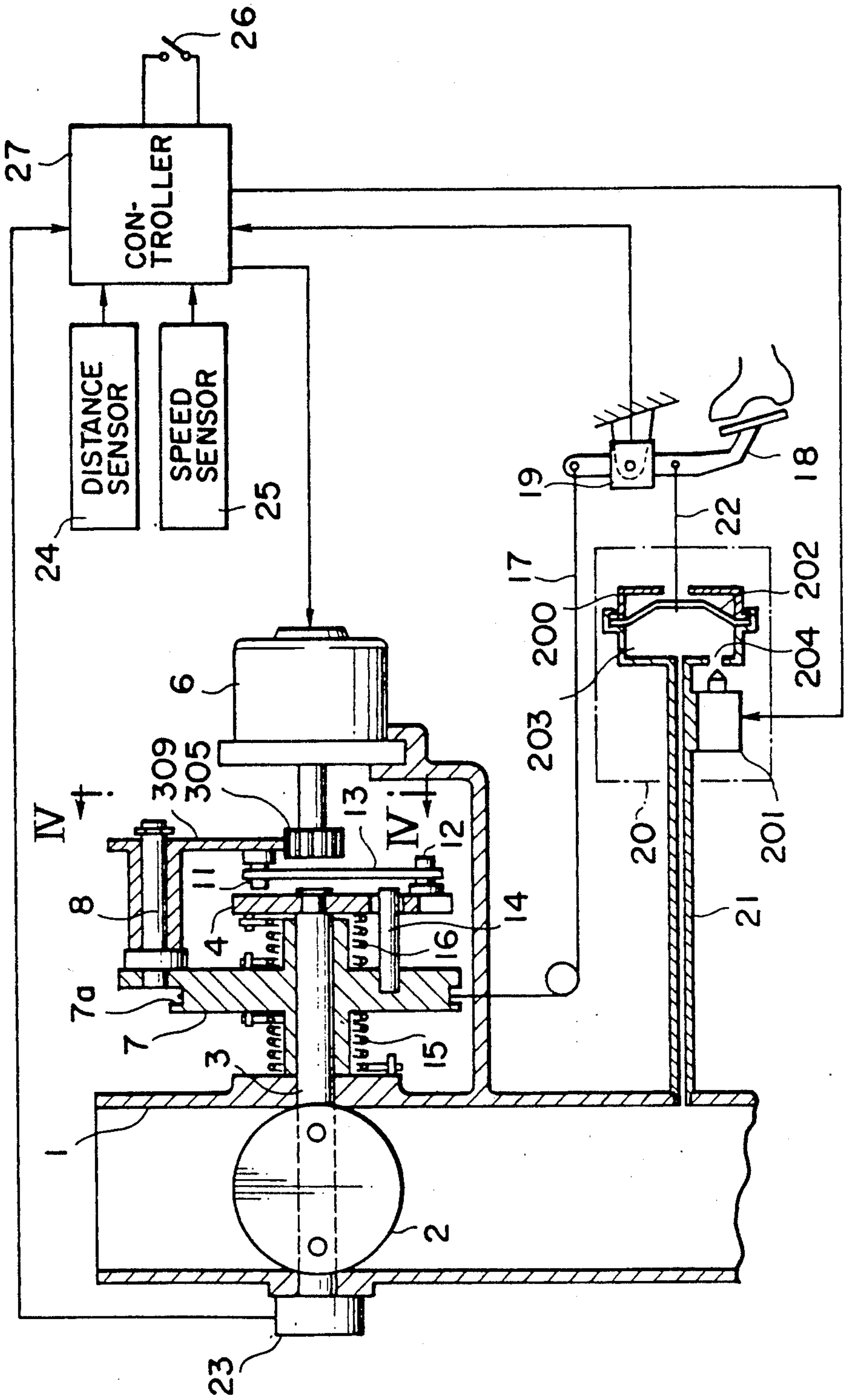
FIG. 3 is a view similar to FIG. 1, but showing another preferred embodiment of the present invention.

FIGS. 3 and 4 show a partially modified embodiment of the present invention. This embodiment is substantially similar in construction and operation to the previously described first embodiment of FIGS. 1 and 2 except for the following. Specifically, in this embodiment, the pulley-and-belt transmission including the first and the second pulleys 5 and 9 and the belt 10 of the first embodiment are replaced with a gear transmission which comprises a first drive gear wheel 305 operatively connected with the rotary shaft of an electric motor 6 and having a plurality of driving gear teeth circumferentially formed on its outer peripheral surface, and a second driven gear wheel 309 in the form of a sector wheel which is greater in diameter than the first gear wheel 305 and which is rotatably mounted through a support shaft 8 on a rotary disk 7 at a location radially apart from the central axis of the rotary disk 7, the driven gear wheel 309 having a plurality of driven gear teeth formed on the radially outer peripheral surface thereof and placed in mesh with the driving gear teeth of the drive gear wheel 305. Thus, when the electric motor 6 is energized to rotate the drive gear wheel 305, the driven gear wheel 309 is rotated around the support shaft 8 at a reduced speed in the direction opposite the direction in which the drive gear wheel 305 rotates.

Figure 5:
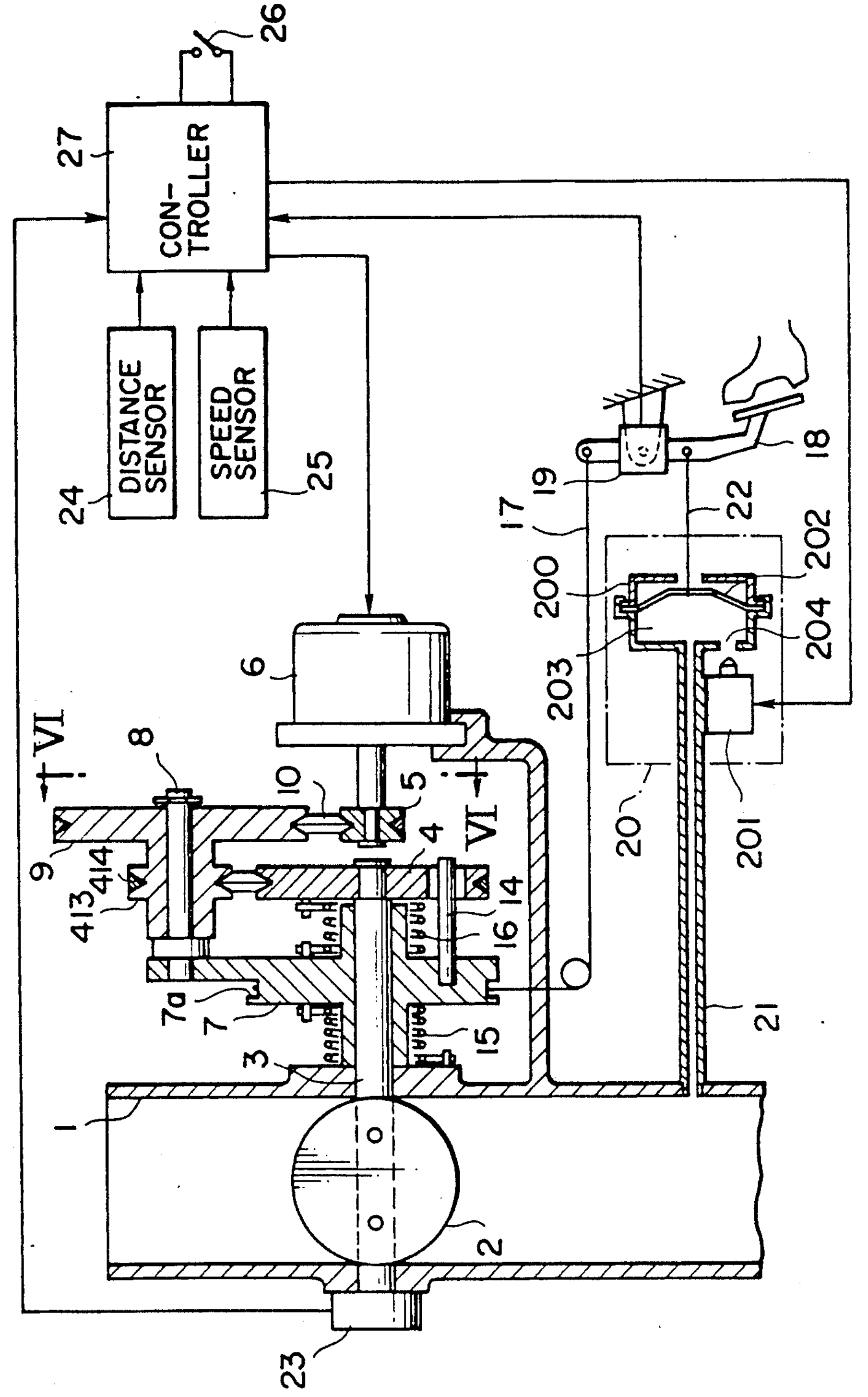
FIG. 5 is a view similar to FIG. 1, but showing a further preferred embodiment of the present invention.
Figure 6:
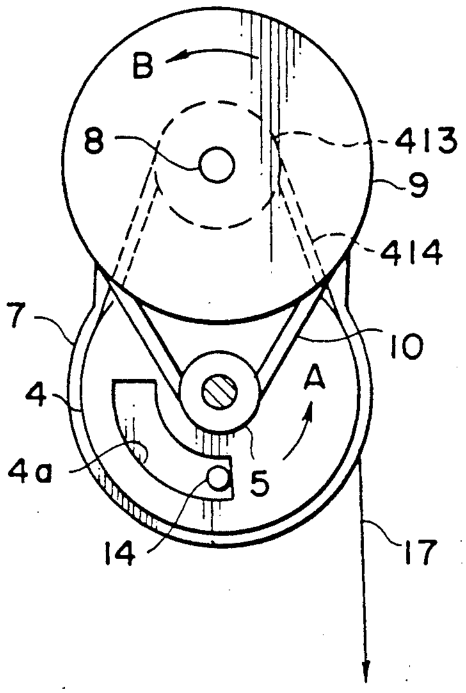
FIG. 6 is a cross section taken along the line VI—VI of FIG. 5.

FIGS. 5 and 6 show another modified embodiment of the present invention. This embodiment is also similar in construction and operation to the first-mentioned embodiment of FIG. 1 except for the following. Namely, in this embodiment, the link mechanism of the first embodiment including the link member 13 for transmitting force between the second pulley 9 and the throttle lever 4 is replaced by a pulley-and-belt transmission. To this end, a third pulley 413 is rotatably mounted on the support shaft 8 fixed to the rotary disk 7 and it is formed integral with second pulley 9 for integral rotation therewith around the support shaft 8. The third pulley 413 has a V-shaped annular groove 413*a* formed on the outer peripheral surface thereof for receiving a V belt 414. A throttle lever 4 fixedly mounted on the valve shaft 3 at its one end is formed in a circular shape and acts as a fourth pulley. The circular throttle lever 4 has a V-shaped annular groove 4*b* formed on the radially outer peripheral surface thereof for receiving the V belt 414. The V belt 414 is entrained around the circular throttle lever 4 and the third pulley 413 for transmitting force from the third pulley 413 to the throttle lever 4.

In the above-described embodiments, the present invention is applied to a throttle control apparatus with a cruise control device having a intervehicle distance control function, but is it of course applicable to a throttle control apparatus with a cruise control device having no intervehicle distance control function as well as to a throttle control apparatus without any cruise control device.

Although in the above embodiments, the rotation-limiting slot 4*a* is formed in the throttle lever 4 and the stop pin 14 is provided on the rotary disk 7, the rotation-limiting slot 4*a* and the stop pin 14 may be provided in and on the and the rotary disk 7 throttle lever 4, respectively. Further, the second pulley 9 or the second gear wheel 309 and the throttle lever 4 are operatively connected with each other through the link member 13 or the pulley-and-belt transmission 413, 414 and 4, but other connecting means such as a sprocket-and-chain transmission, a gear transmission, a rod, a wire and the like can be similarly available in place of the link member and the pulley-and-belt transmission. Also, the pulley-and-belt transmission including the first and second sprockets 5, 9 and the V belt 10 in the first and third embodiments (FIGS. 1, 2 and FIGS. 5, 6) and the gear transmission in the second embodiment (FIGS. 3 and 4) can be replaced by other like power-transmitting means such as a sprocket-and-chain transmission including a first and a second sprocket and a chain or a toothed belt. All of such modifications can be made with substantially the same results.

What is claimed is:

1. A throttle control apparatus for an internal combustion engine, comprising:

a throttle valve disposed in an intake pipe for adjusting the flow rate of intake air supplied to the engine;

a valve shaft rotatably supported on the intake pipe and fixedly mounting thereon said throttle valve for rotation therewith;

throttle lever means fixedly mounted on said valve shaft for rotation therewith;

a motor operatively connected with said throttle lever means for driving said throttle lever means to thereby adjust the opening degree of said throttle valve;

power-transmitting means operatively connected between said throttle lever means and said motor for transmitting power from said motor to said throttle lever means in such a manner that said throttle lever means is forced to rotate by said motor;

an accelerator pedal adapted to be operated by an operator;

rotary disk means rotatably mounted on said valve shaft and operatively connected with said accelerator pedal in such a manner that it is rotated around said valve shaft as said accelerator pedal is operated by the operator; and rotation-limiting means for limiting relative rotation between said throttle lever means and said throttle disk means to a predetermined rotational range whereby the maximum opening degree of said throttle valve due to said motor is limited to a certain level which corresponds to the amount of operation of said accelerator pedal due to the operator.

2. The throttle control apparatus according to claim 1, wherein said power-transmitting means comprises:

first drive pulley means operatively connected with said motor;

second driven pulley means rotatably mounted through a support shaft on said rotary disk means;

belt means for connecting between said first and second pulley means so that said second pulley means is driven to rotate around said support shaft as said first pulley means is rotated by said motor; and connection means for operatively connecting between said second pulley means and said throttle lever means in such a manner that said throttle lever means is rotated in accordance with the rotation of said second pulley means.

3. The throttle control apparatus according to claim 1, wherein said power-transmitting means comprises:

a first drive gear wheel operatively connected with said motor;

a second driven gear wheel rotatably mounted through a support shaft on said rotary disk means and engaged with said first drive gear wheel; and connection means for operatively connecting between said second driven gear wheel and said throttle lever means in such a manner that said throttle lever means is rotated in accordance with the rotation of said second driven gear wheel.

4. The throttle control apparatus according to claim 2, wherein said connection means comprises link means having one end rotatably connected with said second driven pulley and the other end rotatably connected with said throttle lever means.

5. The throttle control apparatus according to claim 3, wherein said connection means comprises link means having one end rotatably connected with said second driven gear wheel and the other end rotatably connected with said throttle lever means.

6. The throttle control apparatus according to claim 2, wherein said connection means is a pulley-and-belt transmission means which comprises:

third drive pulley means fixedly mounted on said support shaft for integral rotation with said second driven pulley means;

fourth driven pulley means fixedly mounted on said valve shaft; and belt means for operatively connecting said third and fourth pulley means so that said fourth pulley means is forced to rotate in accordance with the rotation of said third pulley means around said support shaft.

7. The throttle control apparatus according to claim 6, wherein said throttle lever means is integrally formed with an acts as said fourth driven pulley means.

8. The throttle control apparatus according to claim 1, wherein said rotation-limiting means is a slot-and-pin arrangement which comprises:

a slot formed in one of said throttle lever means and said rotary disk means at a location radially apart from the central axis thereof, said slot having two circumferentially spaced ends; and a stop pin fixed to the other of said throttle lever means and said rotary disk means and extending therefrom into said slot in such a manner that it abuttingly engages said slot ends when said throttle lever means rotates in opposite directions relative to said rotary disk means.

9. The throttle control apparatus according to claim 1, further comprising:

a speed sensor for sensing the speed of a vehicle and generating an output signal representative of the sensed vehicle speed;

a throttle sensor for sensing the opening degree of said throttle valve and generating an output signal representative of the sensed throttle valve opening degree;

a controller having a cruise control switch and connected to receive the output signals of said speed sensor and said throttle sensor for controlling said motor; and an actuator operatively connected with said rotary disk means and adapted to be operated by said controller when said cruise control switch is turned on by the operator for driving said rotary disk means to rotate around said valve shaft in a direction to open said throttle valve, whereby said controller determines a target opening degree of said throttle valve corresponding to a target speed at which the vehicle is travelling when said cruise control switch is turned on, and then controls said motor in such a manner that said throttle lever means is rotated by said motor through said power-transmitting means so as to match the opening degree of said throttle valve to the target opening degree; said controller being further operable to make said actuator inoperative so as to allow free movement of said rotary disk means due to the operator through said accelerator pedal.

10. The throttle control apparatus according to claim 9, wherein said actuator is a vacuum-operated actuator which is connected with that portion of said intake pipe which is downstream of said throttle valve.

11. The throttle control apparatus according to claim 9, further comprising a distance sensor for sensing the distance between the present vehicle and a preceding vehicle and generating an output signal representative of the sensed intervehicle distance, wherein said controller determines based on the output signal of said distance sensor whether the intervehicle distance sensed by said distance sensor is less than a predetermined distance, and if the answer is "YES", said controller controls said motor in such a manner as to move said throttle valve in the closing direction.

* * * * *